(12) United States Patent
Mcdowell

(10) Patent No.: US 12,517,876 B2
(45) Date of Patent: Jan. 6, 2026

(54) CHARACTERISTIC DERIVED INDEXATION FOR DATABASE MANAGEMENT AND INFORMATION RETRIEVAL

(71) Applicant: DOORDA LTD, London (GB)

(72) Inventor: Barry Mcdowell, London (GB)

(73) Assignee: DOORDA LTD, London (GB)

( * ) Notice: Subject to any disclaimer, the term of this patent is extended or adjusted under 35 U.S.C. 154(b) by 203 days.

(21) Appl. No.: 18/283,773

(22) PCT Filed: Mar. 24, 2022

(86) PCT No.: PCT/GB2022/050741
§ 371 (c)(1),
(2) Date: Sep. 22, 2023

(87) PCT Pub. No.: WO2022/200797
PCT Pub. Date: Sep. 29, 2022

(65) Prior Publication Data
US 2024/0168930 A1  May 23, 2024

(30) Foreign Application Priority Data
Mar. 25, 2021 (GB) ...................................... 2104235

(51) Int. Cl.
*G06F 16/00* (2019.01)
*G06F 16/215* (2019.01)
(Continued)

(52) U.S. Cl.
CPC ............ *G06F 16/215* (2019.01); *G06F 16/22* (2019.01); *G06F 16/2365* (2019.01); *G06F 40/247* (2020.01)

(58) Field of Classification Search
CPC .... G06F 16/215; G06F 16/22; G06F 16/2365; G06F 40/247; G06F 16/258; G06F 16/29
See application file for complete search history.

(56) References Cited

U.S. PATENT DOCUMENTS 6,575,376 B2    6/2003  Yu
11,005,922 B1 * 5/2021  Pollack ................. G06F 16/909
(Continued)

FOREIGN PATENT DOCUMENTS

WO   WO-2022/200797 A2   9/2022

OTHER PUBLICATIONS

International Search Report and Written Opinion on PCT App. PCT/GB2022/050741 dated Sep. 20, 2022 (19 pages).
(Continued)

*Primary Examiner* — Dinku W Gebresenbet
(74) *Attorney, Agent, or Firm* — Foley & Lardner LLP

(57) ABSTRACT

The present invention relates to methods, computing devices and computer program products for encoding unique combinations of technical characteristics of a set of input data values, or members of a set of input data values, to use as the index to retrieve a unique, corresponding record from an identically encoded reference database. One particular use of such retrieval relates to residential and commercial addresses, in which one or more reference address datasets comprising a plurality of address records are standardised and allocated to two or more sets. A unique identifier is assigned for each unique address component in each set and the standardised plurality of records in each set are encoded by converting each address component to the corresponding unique identifier. A lock code is generated for each of the encoded standardised plurality of records. An input address is received and is standardised. A key code is generated based on the input address and the key code is compared to the lock codes and a Boolean value is output based on the comparison.

19 Claims, 4 Drawing Sheets

(51) Int. Cl.
    *G06F 16/22*     (2019.01)
    *G06F 16/23*     (2019.01)
    *G06F 40/247*     (2020.01)

(56) References Cited

U.S. PATENT DOCUMENTS

| | | | | |
|---|---|---|---|---|
| 2002/0153409 | A1* | 10/2002 | Yu | G06F 16/252 |
| | | | | 235/375 |
| 2010/0223495 | A1* | 9/2010 | Leppard | G06F 11/004 |
| | | | | 711/E12.001 |
| 2013/0181851 | A1* | 7/2013 | Kataoka | H03M 7/40 |
| | | | | 341/52 |
| 2021/0012199 | A1* | 1/2021 | Zhang | G06N 7/01 |
| 2021/0026893 | A1 | 1/2021 | Sinha et al. | |
| 2021/0192267 | A1* | 6/2021 | Gartner | G06N 3/086 |
| 2021/0279604 | A1* | 9/2021 | Seth | G06N 20/00 |

OTHER PUBLICATIONS

Sharma Shikhar et al: "Automated Parsing of Geographical Addresses: A Multilayer Feedforward Neural Network Based Approach", 2018 IEEE 12th International Conference on Semantic Computing (ICSC), IEEE, Jan. 31, 2018 (Jan. 31, 2018), pp. 123-130, XP033345806, DOI: 10.1109/ICSC.2018.00026 [retrieved on Apr. 9, 2018] the whole document.

* cited by examiner

CHARACTERISTIC DERIVED INDEXATION FOR DATABASE MANAGEMENT AND INFORMATION RETRIEVAL

CROSS-REFERENCE TO RELATED APPLICATIONS

This application is a U.S. National Phase Application under 35 U.S.C. § 371 of International Application No. PCT/GB2022/050741, filed on Mar. 24, 2022, which claims the benefit of and priority to GB Appl. No. 2104235.3 filed Mar. 25, 2021, each of which is incorporated herein by reference in their entirety for any and all purposes.

The present invention relates to encoding unique combinations of technical characteristics of a set of input data values, or members of a set of input data values, to use as the index to retrieve a unique, corresponding record from an identically encoded reference database.

BACKGROUND

In situations where data is maintained in various datasets where each dataset is often managed by different parties, include different data structures and may contain errors, it is difficult and problematic to retrieve data from the various datasets. One particular example of such retrieval relates to residential and commercial addresses.

In terms of residential and commercial addresses, it is difficult to identify the validity of an input address along with its actual geographic location based on the various address datasets that are maintained by different parties. This poses a significant problem to many institutions such as banks, credit agencies, insurers, Local Government, Central Government and all other commercial organisations.

As different address datasets are maintained by various parties, each party will arrange the address data in different structures and with varying degrees of accuracy. The different address datasets are often poorly controlled and notoriously unreliable meaning that the address data in one address dataset may be inconsistent with other address datasets maintained by a different party.

Furthermore, address data is often manually entered into computers and web sites which introduces potential errors and inconsistencies such as incorrect spellings, false addresses, and missing data, which is often due to the human interaction in generating the various address datasets.

As such, there is typically no single, accurate reference list of all addresses in any one country.

To further complicate matters, organisations define and use addresses differently. For example, in the UK the Post Office® considers an address as a "delivery point" for postal mail, whilst UK Local Authorities consider a commercial address to be any property for which business rates are liable. Accordingly, a large commercial building may have a single "delivery point" for all tenants according to the Post Office address dataset, but multiple rate-paying tenants within that building, each with their own identifiable premises according to the Local Authority address dataset. Similar drawbacks will equally apply to other countries.

Conventional existing solutions for data matching are typically categorised as "deterministic" or "probabilistic". The conventional solutions determine and score the similarity between records on a sliding scale and produce three categories of results being a definite match, possible matches and a definite non-match, with manual human intervention being required to decide which, if any, of the "possible" matches is valid.

Objects and aspects of the present invention seek to address, at least in part, any or all of the drawbacks and disadvantages described above.

STATEMENT OF INVENTION

According to a first aspect of the present invention there is provided a method of formatting datasets comprising: receiving one or more reference address datasets, wherein each reference address dataset includes a plurality of records, and wherein each record relates to an address, and wherein each address includes one or more address components; standardising the one or more address components for each of the plurality of records; allocating the standardised plurality of records to two or more sets, wherein each set is based on at least one of the one or more address components; assigning, for each set, a unique identifier to each unique address component in the corresponding set; encoding each of the standardised plurality of records in each set by converting each address component in each of the standardised plurality of records to the corresponding unique identifier assigned to each unique address component in the corresponding set; and storing the encoded standardised plurality of records in an Enhanced Address Reference Dataset.

If more than one reference address dataset is received, the method may further comprise merging the received reference address datasets.

If an address component of a record includes a range of building numbers, the method may further comprise creating two additional records wherein the first additional record includes a first building number of the range and the second additional record includes a last building number of the range.

Standardising each of the plurality of records may comprise concatenating two or more address components into a single concatenated string.

The method may further comprise appending a start character to the concatenated string, wherein the start character indicates the start of the address for each of the plurality of records.

Standardising each of the plurality of records may further comprise one or more of capitalising the one or more address components; replacing abbreviations in the one or more address components with a corresponding standard word, wherein the standard word is retrieved from a synonyms dictionary; and replacing misspellings in the one or more address components with a corresponding corrected word, wherein the corrected word is retrieved from the synonyms dictionary.

The step of encoding may further comprise determining an uniqueness of each address in the standardised plurality of records for each set; and wherein determining the uniqueness of each address may comprise determining a frequency of occurrence of the one or more address components within the set; assigning an integer value corresponding to the determined frequency of occurrence; and storing the assigned integer value corresponding to the frequency of occurrence in the Enhanced Address Reference Dataset.

Determining a frequency of occurrence of the one or more address components within the set may comprise determining the frequency of occurrence of a first address component of the concatenated string, wherein the first address component is the right most address component of the concatenated string; determining the frequency of occurrence of a second address component of the concatenated string, wherein the second address component is a combination of the first address component and the next adjacent address component of the concatenated string; determining the frequency of occurrence of a further address component of the concatenated string, wherein the further address component is a combination of the previous address component and the next adjacent address component of the concatenated string; and iteratively repeating the determination of a further address component until the frequency of occurrence for a combination of all address components in the concatenated string is determined.

Allocating the standardised plurality of records to two or more sets may be based on postal area and/or commercial entities.

The address components may include one or more of: building number(s), unit number(s), building name, road, sub-road, postal area, sub-area, postcode, county, country, PO Box, DX number, state, district, province, zip code, and commercial entity name.

The concatenated string may include one or more of: building number(s); unit number(s), building name, road, sub-road, and commercial entity name.

The method may further comprise generating an initial Reference Dictionary, wherein generating the initial Reference Dictionary may comprise storing unique address components and the corresponding unique identifier.

The method may further comprise identifying duplicated records in the Enhanced Address Reference Dataset and tagging the duplicated records.

According to a second aspect of the present invention there is provided a computing device comprising a processor; and a memory; wherein the processor is configured to: receive one or more reference address datasets, wherein each reference address dataset includes a plurality of records, and wherein each record relates to an address, and wherein each address includes one or more address components; standardise the one or more address components for each of the plurality of records; allocate the standardised plurality of records to two or more sets, wherein each set is based on at least one of the one or more address components; assign, for each set, a unique identifier to each unique address component in the corresponding set; encode each of the standardised plurality of records in each set by converting each address component in each of the standardised plurality of records to the corresponding unique identifier assigned to each unique address component in the corresponding set; and store the encoded standardised plurality of records in an Enhanced Address Reference Dataset.

If more than one reference address dataset is received, the processor may be further configured to merge the received reference address datasets.

If an address component of a record includes a range of building numbers, the processor may be further configured to create two additional records wherein the first additional record includes a first building number of the range and the second additional record includes a last building number of the range.

The processor may be further configured to concatenate two or more address components into a single concatenated string.

The processor may be further configured to append a start character to the concatenated string, wherein the start character indicates the start of the address for each of the plurality of records.

The processor may be further configured to capitalise the one or more address components; replace abbreviations in the one or more address components with a corresponding standard word, wherein the standard word is retrieved from a synonyms dictionary; and replace misspellings in the one or more address components with a corresponding corrected word, wherein the corrected word is retrieved from the synonyms dictionary.

The processor may be further configured to determine a uniqueness of each address in the standardised plurality of records for each set; and wherein determining the uniqueness of each address may comprise determine a frequency of occurrence of the one or more address components within the set; assign an integer value corresponding to the determined frequency of occurrence; and store the assigned integer value corresponding to the frequency of occurrence in the Enhanced Address Reference Dataset.

The processor may be further configured to determine the frequency of occurrence of a first address component of the concatenated string, wherein the first address component is the right most address component of the concatenated string; determine the frequency of occurrence of a second address component of the concatenated string, wherein the second address component is a combination of the first address component and the next adjacent address component of the concatenated string; determine the frequency of occurrence of a further address component of the concatenated string, wherein the further address component is a combination of the previous address component and the next adjacent address component of the concatenated string; and iteratively repeat the determination of a further address component until the frequency of occurrence for a combination of all address components in the concatenated string is determined.

The processor may be further configured to allocate the standardised plurality of records to two or more sets is based on postal area and/or commercial entities.

The address components may include one or more of: building number(s), unit number(s), building name, road, sub-road, postal area, sub-area, postcode, county, country, PO Box, DX number, state, district, province, zip code, and commercial entity name.

The concatenated string may include one or more of: building number(s); unit number(s); building name; road; sub-road; and commercial entity name.

The processor may be further configured to generate an initial Reference Dictionary by storing unique address components and the corresponding unique identifier.

The processor may be further configured to identify duplicated records in the Enhanced Address Reference Dataset and tag the duplicated records.

According to a third aspect of the present invention there is provided a computer program product comprising computer readable executable code for implementing the method according to any one of method features of the first aspect.

According to a fourth aspect of the present invention there is provided a method of Building an Address Sets Dataset, comprising: receiving an Enhanced Address Reference Dataset, wherein the Enhanced Address Reference Dataset includes at least an encoded standardised plurality of records allocated to two or more sets; generating at least one lock code for each of the encoded standardised plurality of records in each set; and storing the at least one lock code, for each of the encoded standardised plurality of records in each set, in an Address Sets Database.

Each of the encoded standardised plurality of records may include one or more address components, each address component may have a corresponding unique identifier, and generating the at least one lock code may comprise generating one or more combinations of the one or more address components; identifying the corresponding unique identifier for each address component in each of the combinations; and applying a function to each combination of unique identifiers to generate the lock code for each combination.

Each of the encoded standardised plurality of records may include an assigned integer value corresponding to a frequency of occurrence of the one or more address components; and the step of generating the one or more combinations may be based on at least the assigned integer value corresponding to a frequency of occurrence of the one or more address components.

The function may be a hash function.

The method may further comprise identifying any duplicated lock codes in the Address Sets Database; and deleting the identified duplicate lock codes.

The method may further comprise receiving an initial Reference Dictionary, wherein the initial Reference Dictionary may include unique address components and corresponding unique identifiers; generating a Reference Dictionary, wherein the Reference Dictionary includes one or more unique address components, the corresponding unique identifiers for an address and preferably at least one address information associated with the address.

Storing the at least one lock code may further comprise storing a corresponding address identifier.

According to a fifth aspect of the present invention there is provided a computing device comprising: a processor; and a memory; wherein the processor is configured to: receive an Enhanced Address Reference Dataset, wherein the Enhanced Address Reference Dataset includes at least an encoded standardised plurality of records allocated to two or more sets; generate at least one lock code for each of the encoded standardised plurality of records in each set; and store the at least one lock code, for each of the encoded standardised plurality of records in each set, in an Address Sets Database.

Each of the encoded standardised plurality of records may include one or more address components, each address component may have a corresponding unique identifier, and the processor may be further configured to: generate one or more combinations of the one or more address components; identify the corresponding unique identifier for each address component in each of the combinations; and apply a function to each combination of unique identifiers to generate the lock code for each combination.

Each of the encoded standardised plurality of records may include an assigned integer value corresponding to a frequency of occurrence of the one or more address components; and the processor may be further configured to generate the one or more combinations based on at least the assigned integer value corresponding to a frequency of occurrence of the one or more address components.

The function may be a hash function.

The processor may be further configured to: identify any duplicated lock codes in the Address Sets Database; and delete the identified duplicate lock codes.

The processor may be further configured to: receive an initial Reference Dictionary, wherein the initial Reference Dictionary includes unique address components and corresponding unique identifiers; generate a Reference Dictionary, wherein the Reference Dictionary includes one or more unique address components, the corresponding unique identifiers for an address and preferably at least one address information associated with the address.

The processor may be further configured to store a corresponding address identifier.

According to a sixth aspect of the present invention there is provided a computer program product comprising computer readable executable code for implementing a method according to any one of the method features of the fourth aspect.

According to a seventh aspect of the present invention there is provided a method of matching address data comprising: receiving an Address Sets Database, wherein the Address Sets Database includes one or more lock codes; receiving a Reference Dictionary, wherein the Reference Dictionary includes one or more combinations of unique address components and corresponding unique identifiers; receiving an Input Address, wherein the Input Address includes one or more address components; standardising the one or more address components of the Input Address; generating one or more combinations of the address components of the standardised Input Address; retrieving the unique identifiers for each address component of each combination from the Reference Dictionary; generating a key code for the combination of address components based on the retrieved unique identifiers; comparing the key code to the one or more lock codes in the Address Sets Database; and outputting a Boolean value based on the comparison.

Standardising each of the plurality of records may comprise concatenating two or more address components into a single concatenated string.

The method may further comprise appending a start character to the concatenated string, wherein the start character indicates the start of the address.

Standardising the Input Address may further comprise one or more of: capitalising the one or more address components; replacing abbreviations in the one or more address components with a corresponding standard word, wherein the standard word is retrieved from a synonyms dictionary; and replacing misspellings in the one or more address components with a corresponding corrected word, wherein the corrected word is retrieved from the synonyms dictionary.

Generating the key code may further comprise applying a function to the combination of unique identifiers, wherein preferably the function is a hash function.

The method may further comprise identifying a subset of lock codes in the Address Sets Database based on at least one address component of the Input Address; and the step of comparing the key code to the one or more lock codes in the Address Sets Database may be restricted to the identified subset of lock codes in the Address Sets Database.

According to an eighth aspect of the present invention there is provided a computing device comprising: a processor; and a memory; wherein the processor is configured to: receive an Address Sets Database, wherein the Address Sets Database includes one or more lock codes; receive a Reference Dictionary, wherein the Reference Dictionary includes one or more combinations of unique address components and corresponding unique identifiers; receive an Input Address, wherein the Input Address includes one or more address components; standardise the one or more address components of the Input Address; generate one or more combinations of the address components of the standardised Input Address; retrieve the unique identifiers for each address component of each combination from the Reference Dictionary; generate a key code for the combination of address components based on the retrieved unique identifiers; compare the key code to the one or more lock codes in the Address Sets Database; and output a Boolean value based on the comparison.

The processor may be further configured to concatenate two or more address components into a single concatenated string.

The processor may be further configured to append a start character to the concatenated string, wherein the start character may indicate the start of the address.

The processor may be further configured to capitalise the one or more address components; replace abbreviations in the one or more address components with a corresponding standard word, wherein the standard word is retrieved from a synonyms dictionary; and replace misspellings in the one or more address components with a corresponding corrected word, wherein the corrected word is retrieved from the synonyms dictionary.

The processor may be further configured to apply a function to the combination of unique identifiers, wherein preferably the function is a hash function.

The processor may be further configured to identify a subset of lock codes in the Address Sets Database based on at least one address component of the Input Address; and the step of comparing the key code to the one or more lock codes in the Address Sets Database may be restricted to the identified subset of lock codes in the Address Sets Database.

According to a ninth aspect of the present invention there is provided a computer program product comprising computer readable executable code for implementing a method as defined by any one of the method features of the seventh aspect.

According to a tenth aspect of the present invention there is provided a method of matching address data comprising: receiving one or more reference address datasets, wherein each reference address dataset includes a plurality of records, and wherein each record relates to an address, and wherein each address includes one or more address components; standardising the one or more address components for each of the plurality of records; allocating the standardised plurality of records to two or more sets, wherein each set is based on at least one of the one or more address components; assigning, for each set, a unique identifier to each unique address component in the corresponding set; encoding each of the standardised plurality of records in each set by converting each address component in each of the standardised plurality of records to the corresponding unique identifier assigned to each unique address component in the corresponding set; storing the encoded standardised plurality of records in an Enhanced Address Reference Dataset; generating at least one lock code for each of the encoded standardised plurality of records in each set in the Enhanced Address Reference Dataset; storing the at least one lock code, for each of the encoded standardised plurality of records in each set, in an Address Sets Database; receiving a Reference Dictionary, wherein the Reference Dictionary includes one or more combinations of unique address components and corresponding unique identifiers; receiving an Input Address, wherein the Input Address includes one or more address components; standardising the one or more address components of the Input Address; generating one or more combinations of the address components of the standardised Input Address; retrieving the unique identifiers for each address component of each combination from the Reference Dictionary; generating a key code for the combination of address components based on the retrieved unique identifiers; comparing the key code to the one or more lock codes in the Address Sets Database; and outputting a Boolean value based on the comparison.

According to an eleventh aspect of the present invention there is provided a computing device comprising: a processor; and a memory; wherein the processor is configured to: receive one or more reference address datasets, wherein each reference address dataset includes a plurality of records, and wherein each record relates to an address, and wherein each address includes one or more address components; standardise the one or more address components for each of the plurality of records; allocate the standardised plurality of records to two or more sets, wherein each set is based on at least one of the one or more address components; assign, for each set, a unique identifier to each unique address component in the corresponding set; encode each of the standardised plurality of records in each set by converting each address component in each of the standardised plurality of records to the corresponding unique identifier assigned to each unique address component in the corresponding set; store the encoded standardised plurality of records in an Enhanced Address Reference Dataset; generate at least one lock code for each of the encoded standardised plurality of records in each set in the Enhanced Address Reference Dataset; store the at least one lock code, for each of the encoded standardised plurality of records in each set, in an Address Sets Database; receive a Reference Dictionary, wherein the Reference Dictionary includes one or more combinations of unique address components and corresponding unique identifiers; receive an Input Address, wherein the Input Address includes one or more address components; standardise the one or more address components of the Input Address; generate one or more combinations of the address components of the standardised Input Address; retrieve the unique identifiers for each address component of each combination from the Reference Dictionary; generate a key code for the combination of address components based on the retrieved unique identifiers; compare the key code to the one or more lock codes in the Address Sets Database; and output a Boolean value based on the comparison.

According to a twelfth aspect of the present invention there is provided a computer program product comprising computer readable executable code for implementing a method according to any one of the method features of the tenth aspect.

In the above statements of the invention, the features are provided in relation to address data, however, as will be appreciated, the present invention may also be applicable to different types of data.

It will be appreciated that any features described herein as being suitable for incorporation into one or more aspects or embodiments of the present disclosure are intended to be generalizable across any and all aspects and embodiments of the present disclosure. Other aspects of the present disclosure can be understood by those skilled in the art in light of the description, the claims, and the drawings of the present disclosure. The foregoing general description and the following detailed description are exemplary and explanatory only and are not restrictive of the claims.

DRAWINGS

Embodiments of the present invention will now be described, by way of example only, and with reference to the accompanying drawings, in which.

DETAILED DESCRIPTION

Figure 1:
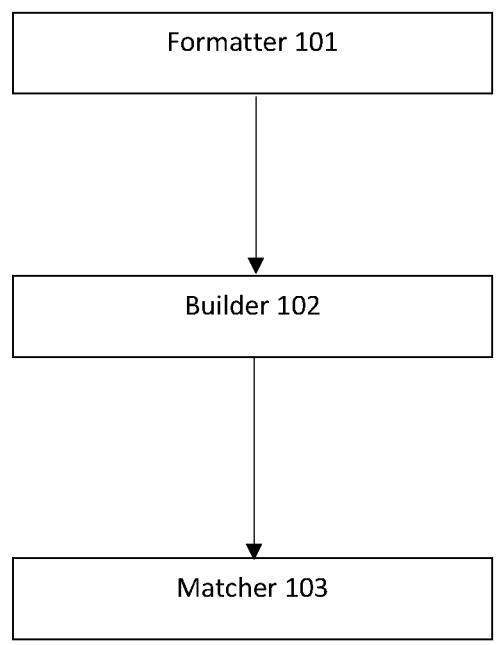
FIG. 1 is a block diagram of a data matching system according to one or more embodiments of the present invention.

Embodiments of the present invention aims to provide "deductive" data matching based on applied set theory to determine a binary result with only two categories of results, unique data match found (e.g. member of subset) and no unique data match found (e.g. not member of subset). In contrast, the conventional systems are based on a "deterministic" or "probabilistic" solution which determine a data match similarity "score" on a sliding scale and require human intervention.

The present invention relates to encoding unique combinations of technical characteristics of a set, or members of a set, of input data values (such as, for example, their number, length, relative input position, validity, data type, structure and frequency with respect to the data within a reference database) to use as the index to retrieve a unique, corresponding record from an identically encoded reference database. Therefore, the input data values are considered as a combination of multiple values (e.g. a set of members) and may derive parts of the index from each value (e.g. member) prior to combining the parts into a whole index value.

As will be appreciated, the present invention can equally apply to many different types of data as the present invention operates on the technical characteristics of the data in order to encode and retrieve the unique and corresponding data from the database based on the input data. One particular example will be described in detail hereinbelow, that is in reference to residential and commercial address data, however, as mentioned, the present invention can equally apply to different data in a variety of fields.

The examples provided of the Data Matching System of the present invention relate to UK addresses and UK address datasets, however, as will be appreciated, the theory and implementation of the Data Matching System may equally apply to addresses and address datasets from other countries.

In the embodiments, the data matching system processes address data from different address datasets to enumerate the combinations of address data components which uniquely and unambiguously identify each address within an Address Sets Database. In other words, the data matching system generates sets of unique locks where each set corresponds to a unique address.

On receipt of an input address data, the data matching system processes the input address data components in a substantially similar manner to then determine if a unique match is identified within the Address Sets Database. In other words, the data matching system generates a set of keys for an input address.

If the input address set overlaps with a record in the Address Sets Database then it can be determined that there is a unique and definite match. In other words, a key of the input address data has found a matching lock for an address record in the Address Sets Database.

However, if the input address set does not overlap with a record in the Address Sets Database, it is determined that there is not a unique match using only the information provided on the input address data. This renders human intervention redundant as there are no "possible/probable match" results and no "false positives".

With reference to FIG. 1, the data matching system may include three components being a Formatter 101, a Builder 102 and a Matcher 103.

The data matching method may therefore include three main processes being:
1) The standardisation, encoding and formatting of one or more address datasets, which is performed by the Formatter 101.
2) The preparation of a Reference Dictionary and an Address Sets Database, which is performed by the Builder 102.
3) The matching of input address data with the Address Sets Database, which is performed by the Matcher 103.

Figure 2:
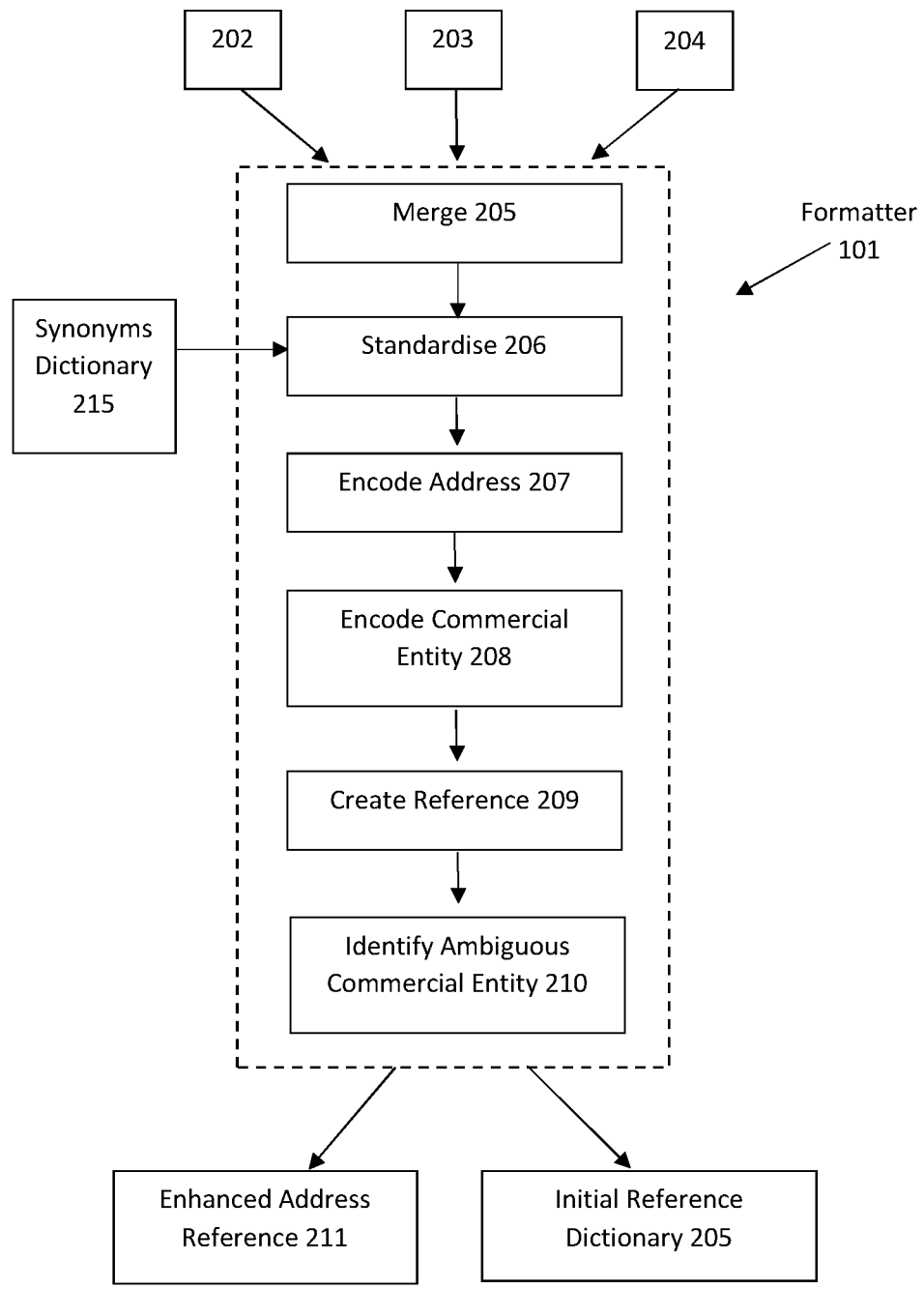
FIG. 2 is a flow diagram of a Formatter according to one or more embodiments of the present invention.

The Formatter 101 will now be described in more detail with reference to FIG. 2. The Formatter 101 receives as input one or more Reference Address Datasets 202, 203, 204.

The Reference Address Datasets may be any suitable address datasets maintained by any institution or organisation relevant to the country or place for which the Data Matching System is to be utilised. The Reference Address Datasets may include a plurality of records where each record relates to an address. Each address includes one or more address components.

In this example, the first Reference Address Dataset 202 may be the UK Royal Mail® Postcode Address File. The first Reference Address Dataset 202 contains the addresses for residential and non-residential properties across the UK and therefore may contain upwards of 30 million addresses. Each record in the first Reference Address Dataset includes one or more components, for example, property name/number, road/street, sub-road/sub-street, area, sub-area, postal town, county, postcode, PO Box, DX number, and so on. Each record may further include a Unique Delivery Point Reference Number (UDPRN) where the UDPRN is a numeric code of up eight digits and provides a unique code for each postal address.

In countries other than the UK, the equivalent address components to those listed above may be used and additionally, or alternatively, further address components, such as district, state, province, zip code, and so on, may also be used in the address data matching system.

As an example, the first Reference Address Dataset 202 may be represented by the following table, in which four example addresses (e.g. four example records) are given for a single postal area:

TABLE 1

| Post Town | Street | Building | Sub-Building | Company | Post Code | UDPRN |
|---|---|---|---|---|---|---|
| Wincaster | Crossland Way | Maysam Court | Unit 4-5 | Big Bets Bookmakers | DN5 9EF | 99983663 |
| Wincaster | Crossland Way | Maysam Court | Unit 3 | Gigaram | DN5 9EF | 99983661 |
| Wincaster | Crossland Way | Maysam Court | Unit 2 | | DN5 9EF | 99983660 |
| Wincaster | Crossland Way | Maysam Court | Unit 1 | | DN5 9EF | 99983659 |

The second Reference Address Dataset 203 may relate to Multi-Residency Addresses. Multi-Residency Addresses refer to a single property (e.g. a single delivery point for postal mail) that contains multiple occupants. For example, a large house that has been converted or divided into multiple apartments where the postal mail for all occupants in the separate apartments is delivered through a single letterbox on the main front door to the original house. Each record in the second Reference Address Dataset 203 may include an identifier for each apartment, for example, an apartment number, but all of the addresses have the same UDPRN as the property has a single delivery point. There are currently approximately 850,000 UDPRNs that are used for multiple addresses in the UK.

The third Reference Address Dataset 204 may relate to addresses for Not Yet Built properties. Not Yet Built property addresses are used for those which are under construction but not yet occupied. Each record in the third Reference Address Dataset will include the address of the Not Yet Built property along with a UDPRN for that address.

Additionally, or alternatively, the data matching system may assign a unique reference for each postal address to use alongside, or instead of, the UDPRN. Using an assigned unique reference for each postal address by the data matching system may be advantageous in case the UDPRN is not accurate and because different Reference Datasets may use different unique references for addresses contained in the different Reference Datasets or some Reference Datasets may not include a unique reference for the addresses contained therein.

The Formatter 101 may perform one or more functions to the input Reference Address Datasets 202, 203, 204 in order to generate an Enhanced Address Reference Dataset 211 and an initial Reference Dictionary 212. The one or more functions may be performed in any suitable order and therefore is not limited to the order that the functions are described below. Any number of the functions described below may be performed by the Formatter 101 depending on the data and the input datasets.

The Formatter 101 may apply a Merge function 205 to the input Reference Address Datasets 202, 203, 204. The Merge function 205 combines (e.g. joins or merges) the first Reference Address Dataset 202 with the second Reference Address Dataset 203 to generate a single record for each unique address. In the case of the Multi-Residency Addresses of the second Reference Address Dataset 203 a record is generated for each residence/company at the multi-residency address. The Merge function 205 then appends the addresses from the Not Yet Built dataset 204 to initially start to generate the Enhanced Address Reference 211.

The Merge Function 205 may also further generate for every record in the Enhanced Address Reference 211 that includes a building number that spans two or more numbers, two additional records which are all identical (e.g. contain the same address components) except for the building number, wherein the first additional record includes the initial building number and the second additional record includes the last building number of the street address. For example, if a record in the Enhanced Address Reference 211 contains the building number and street of "4-8 High Street" then the additional records generated by the Merge function 205 would be "4 High Street" and "8 High Street" along with the same remaining address components, e.g. postal town, county, postcode, and UDPRN.

The Formatter 101 may apply a Standardise function 206 to the Enhanced Address Reference 211 that is being, or has been, generated by the Merge function 205. The Standardise function 206 modifies one or more records in the Enhanced Address Reference 211 to standardise the address components for each of the plurality of records. Thus, the Standardise function 206 modifies the records to ensure all the records are consistent and in the same format.

For example, the Standardise function 206 may modify the address components to ensure all letters are given as upper case letters.

The Standardise function 206 may also modify one or more records in the Enhanced Address Reference 211 to change common abbreviations and misspellings to standard words, for example, "St" would be modified to "STREET", "Ave" would be modified to "AVENUE", and so on. In order to modify the common abbreviations and misspellings, the Standardise function 206 may use a synonyms dictionary 215 where the synonyms dictionary 215 includes a list of value pairs, with each pair comprising the correct value and is associated with one of its aliases/abbreviations/alternatives/common misspellings values. The synonyms dictionary 215 may be predetermined and stored and/or the synonyms dictionary 215 may be user-configurable so additional value pairs can be added as required.

The Standardise function 206 may further concatenate or append one or more of the address component values of the address into a string in a single field in the Enhanced Address Reference 211, for each address record in the Enhanced Address Reference 211. For example, the address components of building number/name, sub-division, building, road, sub-road, area and upper area may be concatenated into a single field in the dataset. The order of the concatenated string in the single field for each record in the Enhanced Address Reference 211 is consistent for each record. The remaining address components, for example, Postal Town and Postal Code may remain in their own respective fields for each address record.

The Standardise function 206 may also append the character "Z" to the start of the concatenated string to indicate the start of each address record in the Enhanced Address Reference 211.

Using the same example addresses given in Table 1, the Standardise function 206 would generate the following output, shown in Table 2.

TABLE 2

| Postal Code | Road Address | Commercial Entity | UDPRN | Post Town |
|---|---|---|---|---|
| DN5 9EF | Z UNIT 4 MAYSAM COURT CROSSLAND WAY | BIG BETS BOOKMAKERS | 99983663 | WINCASTER |
| DN5 9EF | Z UNIT 5 MAYSAM COURT CROSSLAND WAY | BIG BETS BOOKMAKERS | 99983663 | WINCASTER |
| DN5 9EF | Z UNIT 4-5 MAYSAM COURT CROSSLAND WAY | BIG BETS BOOKMAKERS | 99983663 | WINCASTER |
| DN5 9EF | Z UNIT 3 MAYSAM COURT CROSSLAND WAY | GIGARAM | 99983661 | WINCASTER |

TABLE 2-continued

| Postal Code | Road Address | Commercial Entity | UDPRN | Post Town |
|---|---|---|---|---|
| DN5 9EF | Z UNIT 2 MAYSAM COURT CROSSLAND WAY | | 99983660 | WINCASTER |
| DN5 9EF | Z UNIT 1 MAYSAM COURT CROSSLAND WAY | | 99983659 | WINCASTER |

The Formatter 101 may apply an Encode Address function 207 to encode the road address in the Enhanced Address Reference 211. The Encode Address function 207 may determine the uniqueness of combinations of components of each address based on the frequency of the occurrences of the components of the address. The Encode Address function may then encode each address to a unique code.

The Encode Address function 207 may initially process each of the standardised address records to allocate each standardised address to two or more sets based on one or more of the address components. Any suitable address components may be used to allocate the standardised address records to one or more sets, for example, postal area, postal town, commercial entity, and so on. In this example, the address records may be allocated to two or more sets based on the postal area. The Encode Address function 207 may then, for each postal area set, determine the frequency of occurrences of the address components. It has been described that the address records are allocated to two or more sets prior to determining the frequency of occurrences of the address components, however, the allocation to two or more sets may be performed concurrently with determining the frequency of occurrences of the address components.

The components of the concatenated string generated by the Standardise function 206, including the start character "Z", are analysed to determine the frequency of occurrences of the components, or combination of components, of the concatenated string for each address record in a given postal area, and assign an integer value corresponding to the frequency of occurrences for each component and/or combination of components in the address string.

The Encode Address function 207 may start at the right hand side of the string, which is the last component of the address string, to determine the frequency of occurrences of the component, and assigns a corresponding integer value. Next, the last two components of the address string are then processed to determine the frequency of occurrences of that combination of components, and assigns a corresponding integer value. Subsequently, the last three components of the address string are then processed to determine the frequency of occurrences of that combination of components, and assigns a corresponding integer value. This process is repeated by the Encode Address function 207 for each string until the complete component string has been analysed and all corresponding integer values assigned.

The Encode Address function 207 may alternatively start at the left hand side of the string, which is the first component of the address string and apply a similar process to that described above.

In embodiments, the character "Z" may be related or assigned to the postal area, or a subset of the postal area, being processed by the Encode Address function 207 and as each postal area, or subset of the postal area, is unique then there should be at least one assigned integer value of 1 for each address record, meaning each address will be unique.

For example, if the concatenated string for an address in a postal area is "Z UNIT 4 MAYSAM COURT CROSSLAND WAY", the Encode Address function 207 may encode this as "1 1 1 6 6 16 780", meaning:

There are 780 addresses in the given postal area that have "WAY" as their last component.

There are 16 addresses in the given postal area that have the combination of "CROSSLAND WAY".

There are 6 addresses in the given postal area that have the combination of "COURT CROSSLAND WAY".

There are 6 addresses in the given postal area that have the combination of "MAYSAM COURT CROSSLAND WAY".

There is only 1 address in the given postal area that has the combination of "4 MAYSAM COURT CROSSLAND WAY".

There is only 1 address in the given postal area that has the combination of "UNIT 4 MAYSAM COURT CROSSLAND WAY".

There is only 1 address in the given postal area that has the combination of "Z UNIT 4 MAYSAM COURT CROSSLAND WAY", where Z may refer to the postal area, or a subset of the postal area.

Thus, using the example addresses given in Table 2, the example assigned integers are given in Table 3 below, which is an extract of only the road address and the road address uniqueness fields.

TABLE 3

| Road Address | Road Address Uniqueness |
|---|---|
| Z UNIT 4 MAYSAM COURT CROSSLAND WAY | 1 1 1 6 6 16 780 |
| Z UNIT 5 MAYSAM COURT CROSSLAND WAY | 1 1 1 6 6 16 780 |
| Z UNIT 4-5 MAYSAM COURT CROSSLAND WAY | 1 1 1 6 6 16 780 |
| Z UNIT 3 MAYSAM COURT CROSSLAND WAY | 1 1 1 6 6 16 780 |
| Z UNIT 2 MAYSAM COURT CROSSLAND WAY | 1 1 1 6 6 16 780 |
| Z UNIT 1 MAYSAM COURT CROSSLAND WAY | 1 1 1 6 6 16 780 |

The uniqueness integers assigned for each address must always start with a "1" otherwise the address will not be unique and therefore cannot be matched. Thus, the determination of the assigned integers relating to the uniqueness identifies whether all addresses are unique.

Once the frequency of the components has been determined to verify that all addresses are unique, the Encode Addresses function 207 encodes each address. To encode the address the Encode Address function 207 identifies, for each postal area or a subset of the postal area, every unique address component, e.g. each unique word and/or number, that occurs in all of the road addresses in that given postal area. A unique identifier, such as a unique numerical number, is then assigned to each unique address component, e.g. word and/or number, identified. The address components are encoded by converting each address component to the corresponding unique identifier.

The unique identifier may be any suitable unique identifier to encode the address components. The numerical unique identifier may be of a suitable length and the numerical unique identifier may be incremented for each unique address component of a given postal area. Alternatively, the numerical unique identifier may be based on the word and/or number of the address component to which it is assigned, for example, using a hash function or any other suitable method. However, as will be appreciated, the unique identifier may be any suitable unique identifier to encode the address components, e.g. an alphanumeric unique identifier or a character based unique identifier.

In the example given in Tables 1 to 3, each unique word, e.g. Z, UNIT, 4, 5, 4-5, 3, 2, 1, MAYSAM, COURT, CROSSLAND and WAY will each be assigned a unique identifier. Therefore, an example encoding for the example addresses is given in Table 4 below.

TABLE 4

| Road Address | Encoding |
| --- | --- |
| Z UNIT 4 MAYSAM COURT | 1254197 1254219 1254242 1261588 |
| CROSSLAND WAY | 1254898 1261587 1254915 |
| Z UNIT 5 MAYSAM COURT | 1254197 1254219 1254243 1261588 |
| CROSSLAND WAY | 1254898 1261587 1254915 |
| Z UNIT 4-5 MAYSAM COURT | 1254197 1254219 1256365 1261588 |
| CROSSLAND WAY | 1254898 1261587 1254915 |
| Z UNIT 3 MAYSAM COURT | 1254197 1254219 1254241 1261588 |
| CROSSLAND WAY | 1254898 1261587 1254915 |
| Z UNIT 2 MAYSAM COURT | 1254197 1254219 1254206 1261588 |
| CROSSLAND WAY | 1254898 1261587 1254915 |
| Z UNIT 1 MAYSAM COURT | 1254197 1254219 1254239 1261588 |
| CROSSLAND WAY | 1254898 1261587 1254915 |

In this example, the character Z was assigned the unique identifier 1254197, where Z is assigned a unique identifier for each postal area and so in a different postal area, or subset of the postal area, the character Z would be assigned a unique identifier for that postal area, such as 1450078. In this example, the word UNIT is assigned the unique identifier 1254219, the number 4 is assigned the unique identifier 1254242, the word MAYSAM is assigned the unique identifier 1261588, and so on.

The unique identifiers for common words, such as "WAY", "STREET", "AVENUE", etc., may be different for different postal areas or may be consistent across different postal areas or a subset of the postal area. Preferably, the unique identifiers for common words are different for each postal area, or subset of the postal area, such that each unique identifier for each common word is also specific for the postal area, in other words, each unique identifier is associate with only one postal area.

Though it is not shown in Table 4, all components of each address may be assigned a unique identifier, for example, the postal area, town, postcode, etc.

The Encode Address function 207 may also initiate the generation of a Reference Dictionary 212 by storing the previously identified components of the addresses along with the corresponding unique identifier for each.

The Formatter 101 may then apply an Encode Commercial Address function 208 to encode the commercial entities and associated addresses in the Enhanced Address Reference 211. The commercial entities and associated addresses may therefore be allocated to a set related to commercial entities and/or to a sub-set of commercial entities in the set of addresses in a given postal area. The Encode Commercial Address function 208 may initially determine the uniqueness of each commercial entity and the associated address based on the frequency of the occurrences of the components of the commercial entity name and associated address. The Encode Commercial Address function 208 may then encode each commercial entity and address to a unique code.

In terms of addresses that include a commercial entity the unique identifiers for the address described hereinabove could be used in combination with a commercial entity name. However, this may potentially lead to conflicts between the encoding of the addresses by the Encode Address function 207 and the encoding of commercial entities at an address. Therefore, it may be preferable to encode commercial entities and their associated addresses separately to the addresses described hereinabove.

The Encode Commercial Address function 208 may initially format and standardise initials used in commercial entity names, for example, A.B.C would be formatted to become ABC, A-B-C would be formatted to become ABC, and so on. Further formatting and standardisation may include removing or replacing common words or punctuation that may be present in the commercial entity name. For example, "Ltd" may be removed or replaced by "LIMITED", "PLC" may be removed or replaced with "Public Limited Company", "The" may be removed along with commas, quotes, dots, parentheses, dashes and so on.

The Encode Commercial Address function 208 may then determine the uniqueness of the commercial entity names, using the frequency of occurrence of the components of the string forming the commercial entity name. The Encode Commercial Address function 208 starts at the right hand side of the string, which is the last component of the commercial entity name string, to determine the frequency of occurrences of the component, and assigns a corresponding integer value. Next, the last two components of the commercial entity name string are then processed to determine the frequency of occurrences of that combination of components, and assigns a corresponding integer value. Subsequently, the last three components of the commercial entity name string are then processed to determine the frequency of occurrences of that combination of components, and assigns a corresponding integer value. This process is repeated by the Encode Commercial Address function 208 for each string of the commercial entity names until the complete component string has been analysed and all corresponding integer values assigned.

In contrast to the Encode Address function described hereinabove, the need or requirement for uniqueness, e.g. a component string with a frequency occurrence of 1, is negated for commercial entity names and as such there is also no requirement to include a start character, e.g. the "Z" character in this example, at the beginning of the commercial entity name though the start character, e.g. the "Z" character in this example may be included at the beginning of the commercial entity address as this may be useful during the matching process if the Commercial Entity name is omitted from an input address.

Using the examples given in Table 1, there were four addresses that are associated with a commercial entity being:

| Postal Code | Road Address | Commercial Entity | UDPRN | Post Town |
| --- | --- | --- | --- | --- |
| DN5 9EF | UNIT 4 MAYSAM COURT CROSSLAND WAY | BIG BETS BOOKMAKERS | 99983663 | WINCASTER |

| Postal Code | Road Address | Commercial Entity | UDPRN | Post Town |
|---|---|---|---|---|
| DN5 9EF | UNIT 5 MAYSAM COURT CROSSLAND WAY | BIG BETS BOOKMAKERS | 99983663 | WINCASTER |
| DN5 9EF | UNIT 4-5 MAYSAM COURT CROSSLAND WAY | BIG BETS BOOKMAKERS | 99983663 | WINCASTER |
| DN5 9EF | UNIT 3 MAYSAM COURT CROSSLAND WAY | MEGABYTES | 99983661 | WINCASTER |

For the commercial entity name of "BIG BETS BOOKMAKERS", the Encode Commercial Address function 208 may encode this as "13 13 24", meaning:
  There are 24 occurrences of "BOOKMAKERS" in the postal area, or subset of the postal area;
  There are 13 occurrences of "BETS BOOKMAKERS" in the postal area, or subset of the postal area; and
  There are 13 occurrences of "BIG BETS BOOKMAKERS" in the postal area, or subset of the postal area.

Thus, using the example commercial entities, the example assigned integers are given in Table 5 below, which is an extract of only the Commercial Entity Name and the Commercial Entity Name uniqueness fields.

TABLE 5

| Commercial Entity Name | Commercial Entity Name Uniqueness |
|---|---|
| BIG BETS BOOKMAKERS | 13 13 24 |
| BIG BETS BOOKMAKERS | 13 13 24 |
| BIG BETS BOOKMAKERS | 13 13 24 |
| GIGARAM | 1 |

The Encode Commercial Address function 208 may then determine the frequency of occurrence of combinations of the address components associated with the commercial entity for which the address appears in only the subset of commercial entity addresses. For example, the commercial address of "BIG BETS BOOKMAKERS UNIT 4 MAYSAM COURT CROSSLAND WAY" may be encoded as "1 1 1 1 1 1 4 4 11 185", meaning:
  There are 185 commercial entity addresses in the given postal area, or subset of the postal area, that have "WAY" as their last component.
  There are 11 commercial entity addresses in the given postal area, or subset of the postal area, that have the combination of "CROSSLAND WAY".
  There are 4 commercial entity addresses in the given postal area, or subset of the postal area, that have the combination of "COURT CROSSLAND WAY".
  There are 4 commercial entity addresses in the given postal area, or subset of the postal area, that have the combination of "MAYSAM COURT CROSSLAND WAY".
  There is only 1 commercial entity address in the given postal area, or subset of the postal area, that has the combination of "4 MAYSAM COURT CROSSLAND WAY".
  There is only 1 commercial entity address in the given postal area, or subset of the postal area, that has the combination of "UNIT 4 MAYSAM COURT CROSSLAND WAY".
  There is only 1 commercial entity address in the given postal area, or subset of the postal area, that has the combination of "Z UNIT 4 MAYSAM COURT CROSSLAND WAY".
  There is only 1 commercial entity address in the given postal area, or subset of the postal area, that has the combination of "BOOKMAKERS Z UNIT 4 MAYSAM COURT CROSSLAND WAY".
  There is only 1 commercial entity address in the given postal area, or subset of the postal area, that has the combination of "BETS BOOKMAKERS Z UNIT 4 MAYSAM COURT CROSSLAND WAY".
  There is only 1 commercial entity address in the given postal area, or subset of the postal area, that has the combination of "BIG BETS BOOKMAKERS Z UNIT 4 MAYSAM COURT CROSSLAND WAY".

Thus, using the example commercial entity addresses given above, the example assigned integers are given in Table 6 below, which is an extract of only the commercial entity address and the commercial entity address uniqueness fields.

TABLE 6

| Road Address | Road Address Uniqueness |
|---|---|
| BIG BETS BOOKMAKERS Z UNIT 4 MAYSAM COURT CROSSLAND WAY | 1 1 1 1 1 1 4 4 11 185 |
| BIG BETS BOOKMAKERS Z UNIT 5 MAYSAM COURT CROSSLAND WAY | 1 1 1 1 1 1 4 4 11 185 |
| BIG BETS BOOKMAKERS Z UNIT 4-5 MAYSAM COURT CROSSLAND WAY | 1 1 1 1 1 1 4 4 11 185 |
| GIGARAM Z UNIT 3 MAYSAM COURT CROSSLAND WAY | 1 1 1 1 4 4 11 185 |

Once the frequency of the components has been determined, the Encode Commercial Address function 208 encodes each commercial entity address. To encode the commercial entity address the Encode Commercial Address function 208 identifies, for each postal area set or a postal area subset, every unique word and/or number that occurs in all of the commercial entity addresses in the set or subset. A unique identifier, such as a unique numerical number, is then assigned to each unique word and/or number identified.

The unique identifier may be any suitable unique identifier to encode the commercial entity address string. The numerical unique identifier may be of a suitable length and the numerical unique identifier may be incremented for each unique word and/or number in the given postal area set. Alternatively, the numerical unique identifier may be based on the word and/or number to which it is assigned, for example, using a hash function or any other suitable method. However, as will be appreciated, the unique identifier may be any suitable unique identifier to encode the address components, e.g. an alphanumeric unique identifier or a character based unique identifier. The address components are then encoded by converting each address component to the corresponding unique identifier.

In the example given in Tables 5 and 6, each unique word and/or number, e.g. BIG, BETS, BOOKMAKERS, GIGARAM, UNIT, 4, 5, 4-5, 3, MAYSAM, COURT, CROSS- LAND and WAY will each be assigned a unique identifier. Therefore, an example encoding for the example addresses is given in Table 7 below.

TABLE 7

| Commercial Entity Address | Encoding |
|---|---|
| BIG BETS BOOKMAKERS Z UNIT 4 MAYSAM COURT CROSSLAND WAY | 1254822 1254821 1254820 1254205 1254230 1254340 1261590 1254900 1261589 1254952 |
| BIG BETS BOOKMAKERS Z UNIT 5 MAYSAM COURT CROSSLAND WAY | 1254822 1254821 1254820 1254205 1254230 1254261 1261590 1254900 1261589 1254952 |
| BIG BETS BOOKMAKERS Z UNIT 4-5 MAYSAM COURT CROSSLAND WAY | 1254822 1254821 1254820 1254205 1254230 1256366 1261590 1254900 1261589 1254952 |
| GIGARAM Z UNIT 3 MAYSAM COURT CROSSLAND WAY | 1261591 1254205 1254230 1254308 1261590 1254900 1261589 1254952 |

The commercial entity name encoding may be stored separately in a field for each commercial entity name in a commercial entity address record in the Enhanced Address Reference 211, and therefore in the above example, the encoding of BIG BETS BOOKMAKERS that is stored would be "1254822 1254821 1254820" and GIGARAM would be "1261591".

Though it is not shown in Table 7, all components of each address may be assigned a unique identifier, for example, the postal area, town, postcode, etc.

The Encode Commercial Address function 208 may also add to the generation of the initial Reference Dictionary 212 by storing the combinations of words of the commercial entity names and the commercial entity addresses with its corresponding unique identifier.

The Enhanced Address Reference 211 generated by the Formatter 101 will therefore include several fields for each record including Postcode, Road Address, Road Address Uniqueness, Road Address Encoding, Commercial Entity Name, Commercial Entity Name Uniqueness, Commercial Entity Name Encoding, Commercial Entity Address Uniqueness, Commercial Entity Address Encoding, UDPRN (or other suitable unique reference), and the Postal Area (or subset of the Postal Area).

The Formatter 101 may further apply a Create Reference function 209, in which the road and assigned reference are stored along with the associated postal area and postal code in the initial Reference Dictionary 212. The Create Reference function 209 identifies the road as all values to the right of any unique values, identified as a 1. Thus, in the example of "Z UNIT 4 MAYSAM COURT CROSSLAND WAY" with the assigned integer values relating to the frequency occurrence being "1 1 1 6 6 16 780" then the road part is identified by the integer values to the right of the unique values given as 1. In this example, this would be "6 6 16 780" which refers to the road of "MAYSAM COURT CROSSLAND WAY". The combination of road words and the assigned encoding values are then stored in the initial Reference Dictionary 212 along with the associated postal area, which in this example is "WINCASTER" and the associated postal code which in this example is "DN5 9EF".

The Formatter 101 may further apply an Identify Ambiguous Company Address function 210, in which any ambiguous or duplicate address relating to a company are identified. For example, commercial entities on a road may be addressed by the company name and road, rather than include any number of the commercial entity address on that road, or commercial entities in a food court may be identified by their commercial entity name within the common address of the food court rather than by a unit number within the food court. As such these addresses may be duplicated or ambiguous until the commercial entity name is included in the address. The duplicated or ambiguous addresses can be identified by the Identify Ambiguous Company function 210 as they will not have a unique integer value assigned at the left most position of the frequency of occurrence. If an address is identified that is either a duplicate or ambiguous then the address is tagged so that it is not considered for matching unless the input address contains a commercial entity name, therefore, the commercial entity name at the address provides the uniqueness. As an example, Table 8 below shows three commercial entities all located on a train station concourse and therefore have the same road address. The uniqueness will be formed by the inclusion of the commercial entity name and therefore as the road addresses for each commercial entity are the same then they may be tagged to prevent one or more lock codes being generated for the road address alone, thus one or more lock codes will only be generated for combinations of the road address that includes at least part of the commercial entity name.

TABLE 8

| Road Address | Road Address Uniqueness | Commercial Entity Name |
|---|---|---|
| Z CONCOURSE WINCASTER RAILWAY STATION STATION COURT | 4 4 7 7 7 8 722 | READ ALL ABOUT IT |
| Z CONCOURSE WINCASTER RAILWAY STATION STATION COURT | 4 4 7 7 7 8 722 | TASTY COFFEE |
| Z CONCOURSE WINCASTER RAILWAY STATION STATION COURT | 4 4 7 7 7 8 722 | TOP SANDWICH |

The output of the Formatter 101 may include the generated Enhanced Address Reference Dataset 211 along with the initial Reference Dictionary 212.

Figure 3:
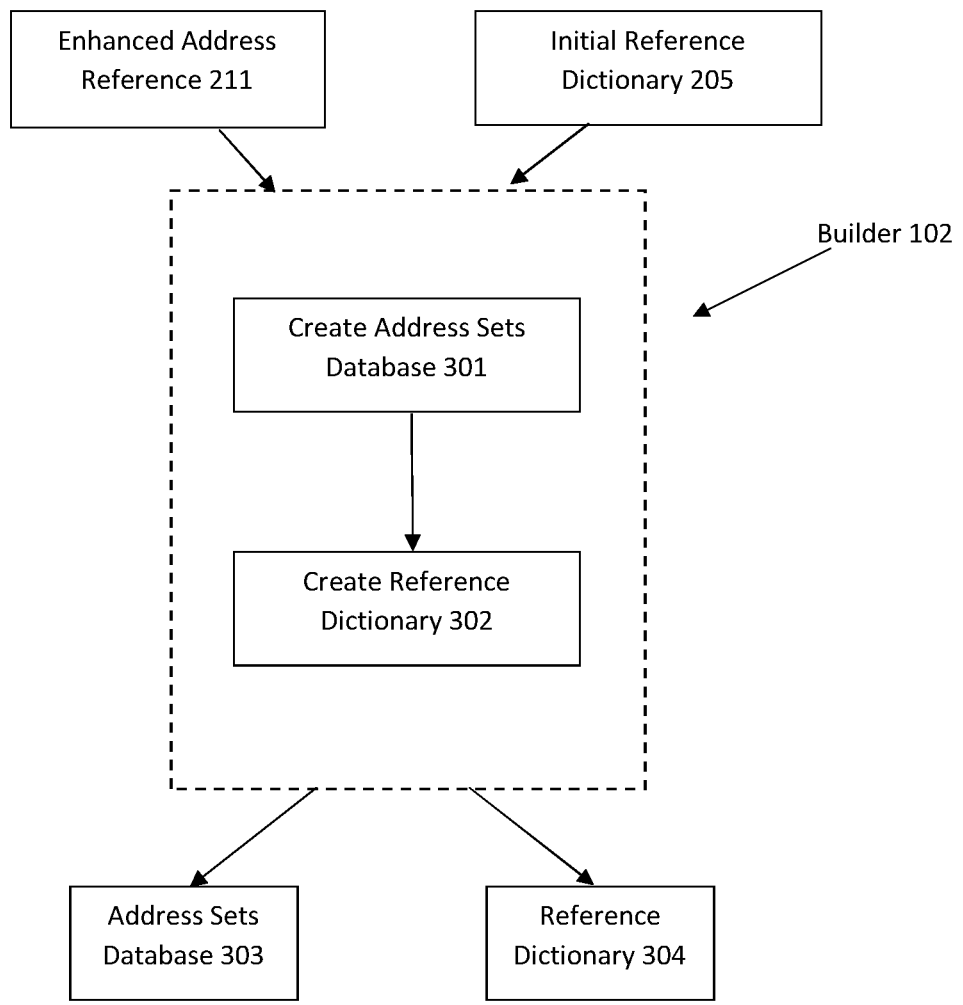
FIG. 3 is a flow diagram of a Builder according to one or more embodiments of the present invention.

The Builder 102 will now be described with reference to FIG. 3. The Builder 102 receives as input the Enhanced Address Reference Dataset 211 and the initial Reference Dictionary 212. The Enhanced Address Reference Dataset 211 includes at least an encoded standardised plurality of records that are allocated to two or more sets.

The Builder 102 outputs an Address Sets Database 303 and the complete Reference Dictionary 304.

The Builder 102 aims to generate a set of codes, e.g. lock codes, where each lock code represents a unique set of values from a single address in the Enhanced Address Reference Dataset 211.

The Create Address Sets function 301 initially creates a temporary data structure per postal area set, or subset of a postal area, in the Enhanced Address Reference Dataset 211. For each record per postal area set, or subset of a postal area, the Create Address Sets function 301 generates a set of several output records, where each set may include a pair of integer codes. The pair of integer codes correspond to (i) a lock code and (ii) an address identifier (e.g. the UDPRN, commercial entity identifier at an address, or any other unique reference). The lock code may be generated by a hash function and may be of any suitable length e.g. an 8 digit hash lock code, a 16 digit hash lock code, a 32 digit hash lock code, a 64 digit hash lock code and so on. In the following examples, a 16 digit hash lock code is used.

Each output record may contain the hash lock code of a set of components of a single address which are unique within a postal area set. The set of several output records created may include a hash lock code based on one or more of the following combinations:

Combinations of two words from the road address which are unique within the postal area.
Words within the road address plus the postal code.
Words within the road address plus the postal area.
Words within the commercial entity name plus the postal code.
Words within the commercial entity name plus the postal area.
Words within the road address plus words within the commercial entity name.
Words within the road address, words within the commercial entity name plus the postal area.

As will be appreciated, the above list is not exhaustive and further combinations may be utilised as required.

The Create Address Sets function 301 uses the address uniqueness in relation to the frequency of occurrences to determine the one or more combinations that may be used to generate one or more lock codes for each address in the Enhanced Address Reference Dataset 211. The assigned integers identify the unique components of an address and/or for a commercial entity address.

For example, the address "Z UNIT 2 MAYSAM COURT CROSSLAND WAY" had the integers assigned of "1 1 1 6 6 16 780" meaning that a couple of examples of unique combinations would be:

"Z UNIT 2 MAYSAM COURT"; and
"2 MAYSAM COURT".

For example, the commercial entity address "BIG BETS BOOKMAKERS Z UNIT 4 MAYSAM COURT CROSSLAND WAY" had the integers assigned of "1 1 1 1 1 4 4 11 185" meaning that a couple of examples of unique combinations would be:

"BIG BETS Z UNIT 4 MAYSAM COURT", AND
"BIG BETS 4 MAYSAM COURT".

As would be appreciated there are multiple combinations that could be identified based on an address, and on any commercial entity name and associated address, using the different combinations listed above. The multiple combinations that are identified for a single address record in the Enhanced Address Reference are used to generate integer lock codes based on the encoding corresponding to the components of the address in the combination, such that there will be at least one unique integer lock code and unique reference pair for each address.

Based on the examples of unique combinations above, the Create Address Sets function 301 generates an integer lock code using the encoding of the components and applies a hash function to the encoding, for example:

"Z UNIT 2 MAYSAM COURT" has the encoding of "1254197 1254219 1254206 1261588 1254898" and a hash function is applied to generate an integer lock code based on the encoding, for example, the integer lock code generated by the hash function may be "46739482727420287474109533800789", which may then be combined with the UDPRN of "99983660" to create the pair of integer codes.

"2 MAYSAM COURT" has the encoding of "1254206 1261588 1254898" and a hash function is applied to generate an integer lock code based on the encoding, for example, the integer lock code generated by the hash function may be "78422495857402029485777799240334"", which may then be combined with the UDPRN of "99983660" to create the pair of integer codes.

"BIG BETS Z UNIT 4 MAYSAM COURT" has the encoding of "1254822 1254821 1254205 1254230 1254340 1261590 1254900" and a hash function is applied to generate an integer lock code based on the encoding, for example, the integer lock code generated by the hash function may be "56897124603205780964028167305784", which may then be combined with the UDPRN of "99983663" to create the pair of integer codes.

"BIG BETS 4 MAYSAM COURT" has the encoding of "1254822 1254821 1254340 1261590 1254900" and a hash function is applied to generate an integer lock code based on the encoding, for example, the integer lock code generated by the hash function may be "73069458702310056985314687103269", which may then be combined with the UDPRN of "99983663" to create the pair of integer codes.

Thus, the Address Sets Database 303 includes a list of integer code pairs, which are the generated integer hash lock codes and the corresponding integer address identifier (e.g. the UDPRN, commercial entity id at an address, or any other suitable assigned unique reference) for each of the combinations for each address and commercial entity address. Thus, based on the above example, the Address Sets Database 303 would include:

| HASH | IDENTIFIER |
| --- | --- |
| <46739482727420287474109533800789> | <99983660> |
| <78422495857402029485777799240334> | <99983660> |
| <56897124603205780964028167305784> | <99983663> |
| <73069458702310056985314687103269> | <99983663> |

The Create Address Sets function 301 may also remove any records in the Address Sets Database 301 where the hashes are not unique within the postal area set, or subset of the postal area, as duplicated hashes may indicate that a particular combination of address components occurs in more than one address and therefore does not uniquely identify one address. Thus, the Address Sets Database 303 will only include unique hashes (e.g. lock codes).

The Create Address Sets function 301 will repeat this process for each and every postal area set, or subsets of postal area, creating a new output structure for each postal area set, or subset of the postal area that includes one or more unique hashes for each address and each commercial entity address within the postal area set, or subset of the postal area.

Once all of the postal areas have been processed the Create Address Sets function 301 may concatenate or append all the output structures generated for each postal area set into one single structure as the Address Sets Database 303.

The Builder 102 may also apply a Create Reference Dictionary function 302 in order to generate the Reference Dictionary 304. This may build upon the initial reference dictionary 212 generated by the Formatter 101. The Reference Dictionary 304 may include records that include one or more of the following list of values along with the corresponding encoding for each of the values and at least one address information associated with the address:

Postal Area [postcode town].
Postcode [postcode town, postcode sector, town].
Postcode Sector [list of associated postcode towns].
Commercial Entity Name.
Words within Commercial Entity Name.

Road [postcode plus list of other postcodes on the same road].
Road Address.
Words within road address.
Words and Word mis-spelling templates.

For example, using the example addresses provided hereinabove, the Reference Dictionary 304 may include the records of, amongst others:

```
{'MAYSAM:WINCASTER': 1261588}
{'DN5 9EF': ('DN5','1264847','WINCASTER')}
{'MAYzAM': 'MAYSAM'}
```

All words in the addresses and commercial entity names and associated addresses are included as-is. Additionally, the Reference Dictionary 304 may include alternative spellings that are coded using wildcard characters, e.g. using the wildcard "z" in the above example, which are unambiguous. Alternatively, or additionally, the Create Reference Dictionary function 302 may permit user defined or user-specified spelling mistakes to be added to and included in the Reference Dictionary 304, wherein the user-defined or user-specified errors may be single character or multiple character errors.

Figure 4:
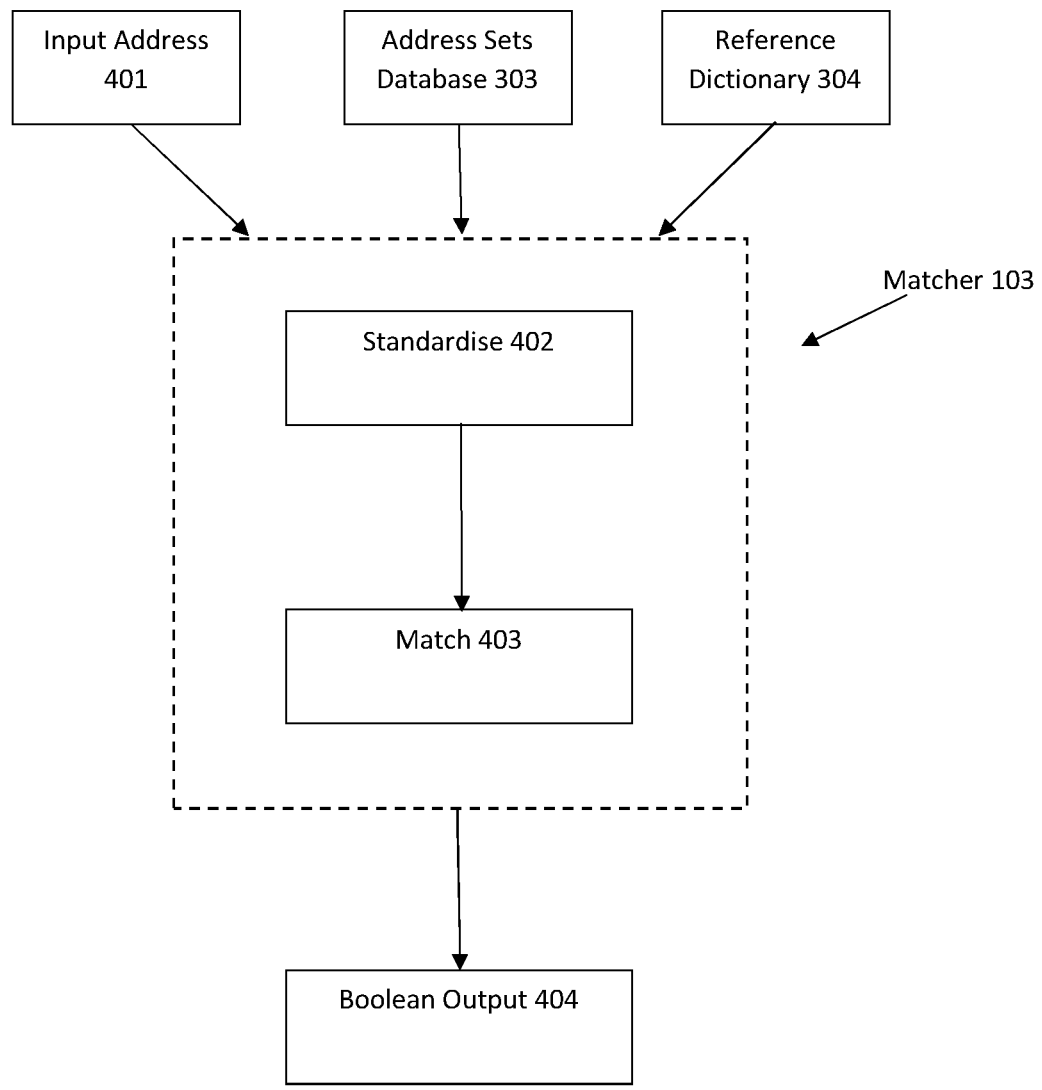
FIG. 4 is a flow diagram of a Matcher according to one or more embodiments of the present invention.

The Matcher 103 will now be described with reference to FIG. 4. The Matcher 103 receives as input an Address 401, the Address Sets Database 303 and the Reference Dictionary 304. The Matcher 103 outputs a Boolean result 404 that corresponds to either "Match" or "No Match".

The Matcher 103 aims to generate a set of codes, e.g. keys, based on the input Address 401 along with the Reference Dictionary 304. The codes, e.g. key codes, are then compared to the codes, e.g. lock codes, in the Address Sets Database 303 to determine if there is a match, e.g. a key opens a lock.

The Matcher 103 may apply a Standardise function 402 to the input Address 401, where the Standardise function 402 applies the same standardisation as performed by the Standardise function of the Formatter. Therefore, the Standardise function 402 may ensure all letters are given as upper case letters, ensure the postcode is of the correct format with a space in the middle, change common abbreviations and misspellings using the synonyms dictionary, concatenate or append certain component values of the address into a single string and may also append the character "Z" to the start of the concatenated string to indicate the start of the input Address 401.

The Matcher 103 may then apply a Match function 403 to determine if the input Address 401 matches an entry in the Address Sets Database 303. In general, the Match function 403 generates one or more combinations of words and numbers from the input Address 401, retrieves the encoding integer value associated with the words/numbers forming each combination, applies the same hash function as used in the Builder to generate a hash code for the combination of words/numbers and searches the Address Sets Database 303 to determine if a match exists.

As the number of addresses and commercial entities will typically be in the region of hundreds of thousands or millions of addresses with at least one hash code for each address in the Address Sets Database, then to reduce the processing power and time needed to search for a match the Match function 403 may apply a more intelligent search process, so that more efficient and effective matching can be achieved.

The search may effectively restrict the matching processing to a substantially small and accurate subset of the entire Address Sets Database 303 based on the standardised input Address.

The intelligent search and restriction of the Address Sets Database to increase the efficiency and reduce processing requirements may be implemented in several different ways to achieve the desired results. One such intelligent search and restriction will now be described.

The Match function 403 may first analyse the standardised input address to identify the postcode.

If the postcode can be identified the Reference Dictionary 304 is used to retrieve the associated postal area, or relevant subset of the postal area.

If the full postcode is not complete or is not located in the Reference Dictionary 304 then the first component of the postcode is used to obtain a set of possible postal areas from the Reference Database 304.

If the postcode is incorrect or missing the postal area may be identified by searching the Reference Dictionary 304 for the combination of the road name and post town identified from the standardised input address. If the combination of road name and post town is located in the Reference Dictionary then the postal area can be retrieved or identified.

Once a postal area, or set of postal areas, are retrieved from the Reference Dictionary 304 the search for a match will then be, at least initially, restricted to the identified postal areas.

The Match function 403 may then proceed to attempt to find a match for the input address in the postal area subset(s) of the Address Sets Database. The Match function 403 may classify the standardised input address into combinations of words/numbers starting with the smallest most restrictive combinations. For each combination the Match function 403 may retrieve the encoding integer for each number/word that forms the combination and apply the hash function to the combination of encoding integers to determine a hash code for the combination. The Address Sets Database, restricted to the set(s) of the identified postal area, is then searched to identify whether a match can be found. If a match is found then the Match function outputs a Boolean result 404 that corresponds to a match and the Match function 403 ends.

If no match is found then a further different combination of numbers/words from the standardised input address is identified, the encoding integers for the combination are retrieved form the Reference Dictionary, the hash function is applied to determine a hash code for the combination and the Address Sets Database, restricted to the set(s) for the identified postal area, is then searched to identify whether a match can be found. If a match is found then the Match function outputs a Boolean result 404 that corresponds to a match and the Match function 403 ends.

If no match is found then the process is iteratively repeated for further combinations of numbers/words from the standardised input address until a match is found or all possible combinations of numbers/words from the standardised input address have been tested and no match found.

If no match is found and all combinations of the standardised input address have been tested then the Match function 403 may perform additional analysis in case the input address is not correct.

For example, the Match function 403 may attempt to identify the correct road and postal area for the given postcode from the Reference Dictionary and search the input address string to see if the component words exist within it. The search allows for words being misspelled, split or concatenated, e.g. a search for "OAKHALL" would also search for "OAK HALL". If words exist within the input address then the combination is encoded using the Reference Dictionary, the hash function applied and the postal area subset of the Address Sets Database is searched to attempt to identify a match.

If a match is not identified, the Match function 403 may then attempt to validate the road/street name and a sub-area of the town. The Reference Dictionary is searched for the combination of road/street and sub-area to determine if values from the sets of possible post towns, postal areas and postcodes exist within the input address. If words exist within the input address then the combination is encoded using the Reference Dictionary, the hash function applied and the Address Sets Database is searched to attempt to identify a match.

If a match is not identified based on the combinations of input address and potential post town then the postcode may be incorrect. The Match function 403 may therefore attempt to determine a set of possible post towns or postcodes based on the road/street name from the Reference Database. Combinations of the input address with the set of possible post towns or postcodes may be determined and each combination in turn can be encoded using the Reference Dictionary, the hash function applied and the Address Sets Database is searched to attempt to identify a match.

If no match is identified then the Match function 403 may attempt different spellings of the words of the input address in case they have been misspelt. Combinations of the input address with different spellings of one or more words in the input address may be determined and each combination in turn can be encoded using the Reference Dictionary, the hash function applied and the Address Sets Database searched to attempt to identify a match.

If a match is determined at any stage then a "Match" Boolean value, e.g. "1", is output. However, if no match is found then a "No Match" Boolean value, e.g. "0", is output.

As an example of the Matcher using the example addresses provided above, the Input Address 401 may be "Big bets, 4 Maysam Crt, Cross Land Way, Wincaster, England, UK". The Input Address 401 is then formatted and standardised to generate a formatted input address of "Z BIG BETS 4 MAYSAM COURT CROSS LAND WAY".

Based on the Input Address 401 the Matcher may identify the set (or subsets) for the encoding as relating to the postal area of "WINCASTER". The set (or subsets) can still be identified if the postal area is missing, misspelt and so on, based on the Input Address and the Reference Dictionary.

The formatted input address is then analysed to identify the Commercial Entity of "BIG BETS", the premises number, e.g. "4", and the road name, e.g. "MAYSAM COURT". Thus, based on the analysis there are a number of combinations of the formatted input address that may be used in order to identify a match in the most efficient and effective search which minimises processing resources.

As a commercial entity name is identified then the commercial entity name is used within the combinations of the formatted input address. One such combination may be based on the commercial entity name, the premises number and road name, being "BIG BETS 4 MAYSAM COURT". The Matcher may refer to the Reference Dictionary to retrieve the encoding value for this commercial entity combination, which would be in these examples "1254822 1254821 1254340 1261590 1254900". The hash function is applied to generate the hash code of "73069458702310056985314687103269", e.g. to determine the key. The Matcher then searches the previously identified set (or subsets) of the Address Sets Database for any matches to the generated hash key code, e.g. find a lock that the key opens. As the hash code does exist in the Address Sets Database then a match is found and the "Match" Boolean value, e.g. "1", is output.

As mentioned above, based on the formatted input address there were numerous options to generate combinations that may be used to identify a match either initially or if the first matching attempts were unsuccessful.

The component order of input the address does not need to be correct in order to potentially identify a match. For instance, a formatted input address of "Z CROSS LAND WAY MAYSAM COURT 4", where the premises number and road names are provided in the wrong order would not affect the matching process as the same combinations of numbers/words can be generated from the formatted input address irrespective of the order in which the addresses are input.

Spelling errors may be identified through failure to encode a word value against the Reference Dictionary. Potential spelling errors may be considered if a match cannot be obtained in the various generated combinations of the input numbers/words. For example, a spelling error in the word "MAYSAM" of the input address to read "MAYAM" may be a relevant spelling error as it may prevent road confirmation from the Reference Dictionary. Any words not located in the Reference Dictionary may be identified as "0" and the Matcher may provide one or more potential spelling options to the Reference Dictionary to identify if any of the potential spellings are present in the Reference Dictionary within the relevant set (or subsets). For example, using a wild character the input to the Reference Dictionary of "MAYzAM" would provide a hit of "MAYSAM" from the Reference Dictionary. This amended spelling of the road name may then be used in a combination of the formatted input address to retrieve the corresponding encoding for the combination to which the hash function is then applied and the resulting hash code searched for in the Address Sets Database.

Other issues relating to the input address, such as additional spaces splitting up words, e.g. "CROSSLAND" being input as "CROSS LAND" may be identified if no matches were found based on the input address and fixed using string manipulation, e.g. to concatenate the two words "CROSS" and "LAND" together.

Therefore, the Matcher applies intelligent algorithms in order to attempt various combinations of the formatted input address to find a match in the Address Sets Database. If no match is found then it can be considered with certainty that the input address does not exist uniquely in the Address Sets Database.

The embodiments of the present invention provides an efficient and effective data matching system based on applied set theory to determine a binary result, which is significantly advantageous over the conventional systems that are based on a "deterministic" or "probabilistic" solution which determine a data match similarity "score" on a sliding scale and require human intervention. The embodiments of the present invention further improves the address data match rate in comparison to the conventional systems and is expected to provide a significant improvement over the conventional systems, in particular, in relation to speed and accuracy.

The above described examples and embodiments focused on residential and commercial address data. However, as mentioned hereinabove, the present invention relates to encoding unique combinations of technical characteristics of a set of, or members of a set of, input data values (such as their number, length, relative input position, validity, data type, structure and frequency with respect to the data within a reference database) to use as the index to retrieve a unique, corresponding record from an identically encoded reference database. Thus, the present invention relates to the management and retrieval of data from datasets within one or more databases based on the technical characteristics of the data, rather than necessarily the type of data or information being stored within the datasets.

In the foregoing embodiments, features described in relation to one embodiment may be combined, in any manner, with features of a different embodiment in order to provide a more efficient and effective data matching system. Note that, the above description is for illustration only and other embodiments and variations may be envisaged without departing from the scope of the invention as defined by the appended claims.

The invention claimed is:

1. A method of matching address data comprising:
   receiving one or more reference address datasets, wherein each reference address dataset includes a plurality of records, and wherein each record relates to an address, and wherein each address includes one or more address components;
   standardising the one or more address components for each of the plurality of records;
   allocating the standardised plurality of records to two or more sets, wherein each set is based on at least one of the one or more address components;
   assigning, for each set, a unique identifier to each unique address component in the corresponding set;
   encoding each of the standardised plurality of records in each set by converting each address component in each of the standardised plurality of records to the corresponding unique identifier assigned to each unique address component in the corresponding set;
   storing the encoded standardised plurality of records in an Enhanced Address Reference Dataset;
   generating at least one lock code for each of the encoded standardised plurality of records in each set in the Enhanced Address Reference Dataset;
   storing the at least one lock code, for each of the encoded standardised plurality of records in each set, in an Address Sets Database;
   receiving a Reference Dictionary, wherein the Reference Dictionary includes one or more combinations of unique address components and corresponding unique identifiers;
   receiving an Input Address, wherein the Input Address includes one or more address components;
   standardising the one or more address components of the Input Address;
   generating one or more combinations of the address components of the standardised Input Address;
   retrieving the unique identifiers for each address component of each combination from the Reference Dictionary;
   generating a key code for the combination of address components based on the retrieved unique identifiers;
   comparing the key code to the one or more lock codes in the Address Sets Database; and
   outputting a Boolean value based on the comparison.

2. The method of claim 1, in which if more than one reference address dataset is received, the method further comprises:
   merging the received reference address datasets.

3. The method of claim 1, in which if an address component of a record includes a range of building numbers, the method further comprises:
   creating two additional records wherein the first additional record includes a first building number of the range and the second additional record includes a last building number of the range.

4. The method of claim 1, in which standardising each of the plurality of records comprises:
   concatenating two or more address components into a single concatenated string;
   preferably wherein the concatenated string includes one or more of: building number(s), unit number(s), building name, road, sub-road, and commercial entity name;
   preferably the method further comprises appending a start character to the concatenated string, wherein the start character indicates the start of the address for each of the plurality of records; and
   wherein standardising each of the plurality of records preferably further comprises one or more of:
      capitalising the one or more address components;
      replacing abbreviations in the one or more address components with a corresponding standard word, wherein the standard word is retrieved from a synonyms dictionary; and
      replacing misspellings in the one or more address components with a corresponding corrected word, wherein the corrected word is retrieved from the synonyms dictionary.

5. The method of claim 4, in which the step of encoding further comprises:
   determining a frequency of occurrence of the one or more address components within the set;
   assigning an integer value corresponding to the determined frequency of occurrence; and
   storing the assigned integer value corresponding to the frequency of occurrence in the Enhanced Address Reference Dataset.

6. The method according to claim 5, in which determining a frequency of occurrence of the one or more address components within the set comprises:
   determining the frequency of occurrence of a first address component of the concatenated string, wherein the first address component is the right most address component of the concatenated string;
   determining the frequency of occurrence of a second address component of the concatenated string, wherein the second address component is a combination of the first address component and the next adjacent address component of the concatenated string;
   determining the frequency of occurrence of a further address component of the concatenated string, wherein the further address component is a combination of the previous address component and the next adjacent address component of the concatenated string; and
   iteratively repeating the determination of a further address component until the frequency of occurrence for a combination of all address components in the concatenated string is determined.

7. The method of claim 1, in which allocating the standardised plurality of records to two or more sets is based on postal area and/or commercial entities.

8. The method of claim 1, in which the address components include one or more of: building number(s), unit number(s), building name, road, sub-road, postal area, sub-area, postcode, county, country, PO Box, DX number, state, district, province, zip code, and commercial entity name.

9. The method of claim 1, further comprising:
generating an initial Reference Dictionary, wherein generating the initial Reference Dictionary comprises:
storing unique address components; and preferably the method further comprises:
storing one or more associated address information with each unique address component; and
generating and storing a unique identifier for each unique address component.

10. The method of claim 1, further comprising:
identifying duplicated records in the Enhanced Address Reference Dataset and tagging the duplicated records.

11. The method of claim 1, in which generating the at least one lock code comprises:
generating one or more combinations of the one or more address components;
identifying the corresponding unique identifier for each address component in each of the combinations; and
applying a function to each combination of unique identifiers to generate the lock code for each combination; preferably wherein the function is a hash function.

12. The method according to claim 11, in which the step of generating the one or more combinations is based on at least an assigned integer value corresponding to a frequency of occurrence of the one or more address components.

13. The method of claim 1, further comprising:
identifying any duplicated lock codes in the Address Sets Database; and
deleting the identified duplicate lock codes.

14. The method according to claim 1, in which the step of storing the at least one lock code further comprises:
storing a corresponding address identifier.

15. The method of claim 1, in which standardising the Input Address comprises:
concatenating two or more address components into a single concatenated string; and
preferably further comprising:
appending a start character to the concatenated string, wherein the start character indicates the start of the address;
capitalising the one or more address components;
replacing abbreviations in the one or more address components with a corresponding standard word, wherein the standard word is retrieved from a synonyms dictionary; and
replacing misspellings in the one or more address components with a corresponding corrected word, wherein the corrected word is retrieved from the synonyms dictionary.

16. The method of claim 1, in which generating the key code further comprises:
applying a function to the combination of unique identifiers, wherein preferably the function is a hash function.

17. The method of claim 1, further comprising:
identifying a subset of lock codes in the Address Sets Database based on at least one address component of the Input Address; and the step of comparing the key code to the one or more lock codes in the Address Sets Database is restricted to the identified subset of lock codes in the Address Sets Database.

18. A computing device comprising:
a processor; and
a memory; wherein the processor is configured to implement the method of claim 1.

19. A computer program product comprising computer readable executable code on a non-transitory medium that is configured for execution by a processor for implementing the method of claim 1.

* * * * *